US012799918B1

(12) United States Patent
Kordlou

(10) Patent No.: US 12,799,918 B1

(45) Date of Patent: Nov. 17, 2026

(54) KORDLOU GREEN ENERGY SYSTEM—MULTI-AXIS GRAVITATIONAL AND KINETIC ENERGY HARVESTING SYSTEM FROM MARINE WAVES

(71) Applicant: Hossein Kordlou, Woodland Hills, CA (US)

(72) Inventor: Hossein Kordlou, Woodland Hills, CA (US)

( * ) Notice: Subject to any disclaimer, the term of this patent is extended or adjusted under 35 U.S.C. 154(b) by 4 days.

(21) Appl. No.: 19/461,280

(22) Filed: Jan. 27, 2026

Related U.S. Application Data

(63) Continuation-in-part of application No. 19/234,146, filed on Jun. 10, 2025, now Pat. No. 12,535,048.

(51) Int. Cl.

| | |
|---|---|
| ***F03B 17/06*** | (2006.01) |
| ***F03B 11/00*** | (2006.01) |
| ***F03B 11/08*** | (2006.01) |
| ***F03B 13/10*** | (2006.01) |
| ***F03B 13/12*** | (2006.01) |
| ***F03B 13/14*** | (2006.01) |
| ***F03B 13/22*** | (2006.01) |
| ***F03B 13/26*** | (2006.01) |

(52) U.S. Cl.

CPC .......... *F03B 17/061* (2013.01); *F03B 11/004* (2013.01); *F03B 11/08* (2013.01); *F03B 13/10* (2013.01); *F03B 13/12* (2013.01); *F03B 13/14* (2013.01); *F03B 13/22* (2013.01); *F03B 13/26* (2013.01); *F05B 2220/32* (2013.01)

(58) Field of Classification Search

CPC ...... F03B 17/061; F03B 11/004; F03B 11/08; F03B 13/10; F03B 13/12; F03B 13/14; F03B 13/22; F03B 13/26; F05B 2220/32

See application file for complete search history.

(56) References Cited

U.S. PATENT DOCUMENTS 6,114,773 A * 9/2000 Kouris .................... F03B 13/08 60/398

* cited by examiner

*Primary Examiner* — Shafiq Mian

(57) ABSTRACT

A hydrokinetic energy harvesting system configurable for operation in vertical heave mode, inclined mode, or horizontal surge mode. The system comprises a buoyant intake assembly incorporating a telescoping mechanism with inner and outer coaxial conduit members sealed by a reciprocating seal assembly, wherein wave-induced vertical oscillation creates a variable-volume pressure chamber functioning as a positive displacement pump. A hydraulic rectification system with check valves enforces unidirectional flow through an inline turbine module, while a hydraulic accumulator buffers oscillating pressure to maintain continuous turbine rotation. Inclination control via ballast adjustment and mooring tensioning enables reconfiguration between operational modes for varying wave conditions. For large-scale deployment, multiple modular units interconnect via a shared mooring network with common seabed anchors, aggregating power through a centralized export cable.

20 Claims, 6 Drawing Sheets

KORDLOU GREEN ENERGY SYSTEM—MULTI-AXIS GRAVITATIONAL AND KINETIC ENERGY HARVESTING SYSTEM FROM MARINE WAVES

CROSS-REFERENCE TO RELATED APPLICATIONS

This application is a Continuation-in-Part (CIP) of U.S. patent application Ser. No. 19/234,146, filed Jun. 10, 2025, now U.S. Pat. No. 12,535,048, issued Jan. 27, 2026, MODULAR GRAVITY-DRIVEN HYDROKINETIC ENERGY SYSTEM WITH SELF-REGULATING DISCHARGE, INLINE TURBINE MODULE, AND SEABED-INDEPENDENT DEPLOYMENT ARCHITECTURE," the entire disclosure of which is incorporated herein by reference. The present application includes new matter directed to wave-responsive telescoping intake assemblies, hydraulic rectification architectures, surge-mode operation, and dynamic inclination control, which were not disclosed in the parent application.

FIELD OF THE INVENTION

The present invention relates to renewable energy systems, and more particularly to a hydrokinetic energy system configurable for deployment in multiple orientations to harvest energy from wave surge, surface heave, and gravitational potential energy in marine environments.

BACKGROUND OF THE INVENTION

The parent patent disclosed a gravity-driven hydrokinetic system designed for vertical deployment in deep water (typically depths exceeding 100 meters), where hydrostatic pressure differential between intake and discharge drives unidirectional flow through an inline turbine module.

While effective in deep ocean environments, such systems face technical limitations when deployed in shallow coastal waters (depths less than 50 meters) where wave energy manifests primarily as horizontal surge motion or surface heave oscillation rather than deep hydrostatic pressure gradients.

Conventional wave energy converters (WECs) designed for shallow water typically fall into three categories: (1) oscillating water column (OWC) systems requiring air turbines and pneumatic conversion; (2) point absorber buoys with mechanical power take-off systems; and (3) articulated attenuator devices with hinged segments requiring maintenance of mechanical joints in corrosive marine environments.

These prior art systems commonly exhibit low conversion efficiency during irregular wave periods, high maintenance requirements for exposed mechanical components, inability to adapt to changing wave directionality, and complex power conditioning to convert oscillating mechanical motion into grid-compatible electrical output.

There exists a need for a hydrokinetic energy system capable of: (a) operating efficiently across varying water depths from shallow surf zones to deep ocean environments; (b) adapting to dominant wave energy characteristics; (c) converting oscillating wave motion into continuous electrical power output; and (d) maintaining operational reliability in marine environments with reduced maintenance intervention.

SUMMARY OF THE INVENTION

The present invention addresses these limitations by providing a hydrokinetic energy harvesting system extending the principles of the parent patent into shallow water and variable-wave environments. The system comprises: (1) a telescoping intake assembly that mechanically converts surface heave into positive displacement pumping action; (2) a hydraulic rectification and accumulator system that transforms oscillating wave pressure into continuous unidirectional turbine flow; and (3) an inclination control system enabling reconfiguration of conduit orientation from vertical through inclined to substantially horizontal alignment.

In a first embodiment, the system comprises a buoyant intake assembly incorporating a telescoping mechanism with inner and outer coaxial conduit sections sealed by a reciprocating seal assembly, wherein vertical wave motion causes the inner section to telescope relative to the outer section, creating a variable-volume pressure chamber functioning as a positive displacement pump to drive water through the primary conduit in shallow water conditions.

In a second embodiment, the system comprises a primary conduit oriented substantially horizontal or at an oblique inclination, and an intake structure having a wide-aperture rectangular or elliptical geometry oriented perpendicular to prevailing wave propagation direction, wherein the convergent intake geometry captures horizontal kinetic energy of wave surge and converts dynamic pressure into static pressure head within the conduit.

The system incorporates a hydraulic rectification subsystem comprising an inlet check valve preventing backflow during wave recession phases, a hydraulic accumulator fluidly coupled to the primary flow path, and an outlet check valve, wherein the accumulator functions as a hydraulic energy buffer, storing excess pressure during wave crests and releasing stored energy during wave troughs, thereby maintaining continuous turbine rotation.

An inclination control subsystem enables adaptive reconfiguration, comprising a ballast control module capable of selectively ingesting or purging seawater to adjust system buoyancy and center of gravity, and a tensioning mechanism on the mooring tether, wherein coordinated operation of ballast adjustment and tether tensioning allows the system to transition between operational modes in response to changing sea states or seasonal wave climate variations.

For large-scale deployment, multiple modular units may be configured as a distributed array comprising a plurality of individual hydrokinetic modules, a shared interconnected mooring network linking the modules to common seabed anchors, and a power aggregation system wherein individual electrical umbilicals from each module converge into a centralized export cable for grid transmission.

The system operates as a thermodynamically open system, driven by external energy inputs manifested as wave motion from solar radiation and lunar gravitational forces, thereby ensuring sustained operation.

DETAILED DESCRIPTION OF THE PREFERRED EMBODIMENTS

Figure 1:
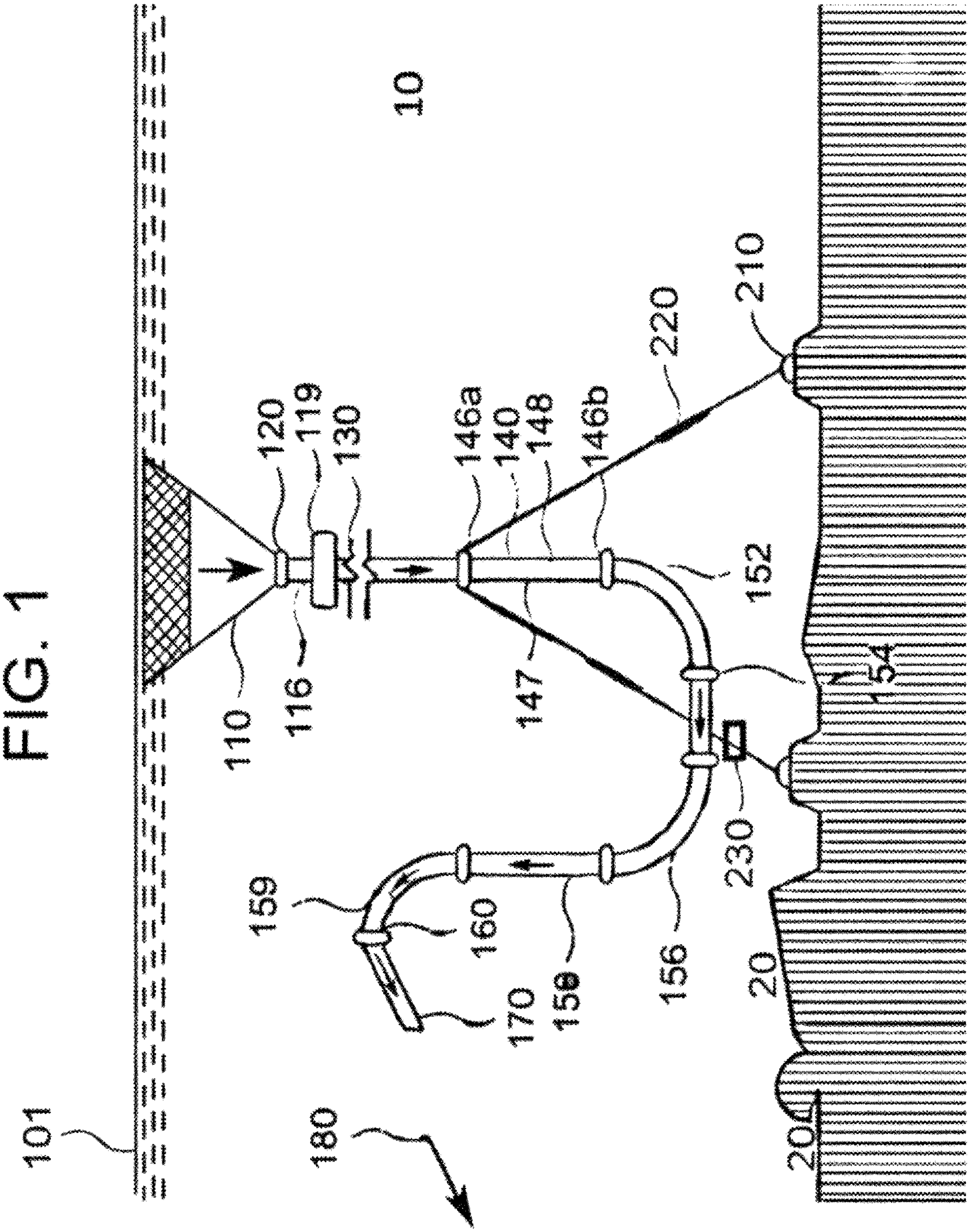
FIG. 1 is a side elevation view of the hydrokinetic system deployed in a vertical heave mode configuration, illustrating the intake assembly, primary conduit, inline turbine module, return flow path, and seabed mooring connection.

System Overview—Vertical Heave Mode Configuration (FIG. 1)

Referring to FIG. 1, a hydrokinetic energy harvesting system 10 is deployed in a shallow water marine environment at a depth suitable for coastal wave energy extraction, typically between shallow coastal waters and deep offshore environments, operating in a vertical heave mode configuration for harvesting energy from surface wave heave motion.

The system 10 comprises a buoyant intake assembly 110 positioned at or near the water surface 101. The intake assembly 110 is configured with positive buoyancy to maintain its position in the wave zone while responding to vertical wave oscillations. A debris screen 112 (visible in FIG. 2) covers the intake aperture to prevent ingress of marine organisms, debris, and other matter that could obstruct flow or damage the turbine module.

The intake assembly 110 connects to an intake neck section 116 which transitions into a primary vertical conduit 130. The primary conduit 130 extends downward through the water column, housing an inline turbine module 140 at an intermediate position. The turbine module 140 comprises a turbine rotor 147 mechanically coupled to an electrical generator 148 within a sealed housing.

The invention incorporates a return flow path enabling closed-loop hydraulic circulation driven by wave motion. A return conduit 160 extends upward from the discharge side of turbine module 140, forming a U-shaped flow path. The return path includes curved transition sections 159 and 170 to minimize turbulence. A flow direction indicator 180 illustrates the circulation direction. An upstream isolation valve 146*a* and a downstream isolation valve 146*b* are positioned respectively upstream and downstream of the turbine module 140 to permit isolation of the turbine for inspection or maintenance.

The system is secured to the seabed via a mooring system comprising a seabed anchor 210, pretensioned tethers 220, and a seabed mooring connection assembly 230. The seabed anchor 210 provides anchoring reaction force and station-keeping. The tethers 220 are configured with catenary geometry to accommodate tidal range and wave excursion. The mooring connection assembly 230 comprises a coupling that transfers tensile loads from the tethers 220 to a seabed foundation.

The mooring connection assembly 230 permits rotational freedom to accommodate changing current directions and wave approach angles while maintaining vertical orientation of the primary conduit 130 during heave mode operation.

Figure 2:
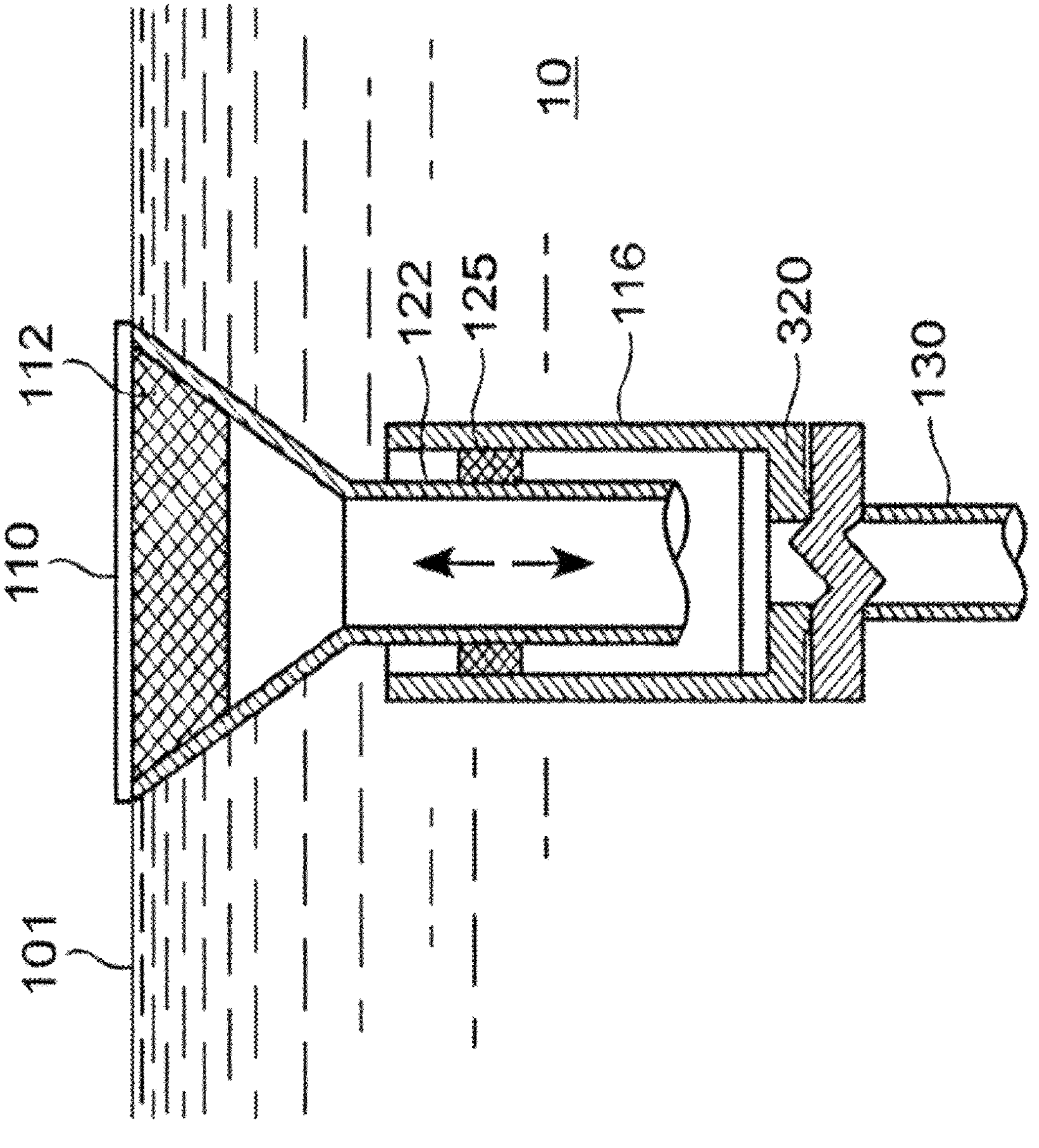
FIG. 2 is a detailed cross-sectional view of the telescoping intake assembly, illustrating the buoyant intake funnel, debris screen, inner telescoping section, outer stationary section, reciprocating seal assembly, and check valve integration.

Wave-Responsive Telescoping Intake Assembly (FIG. 2)

FIG. 2 illustrates the telescoping intake assembly, which mechanically converts vertical oscillatory motion of surface waves into positive displacement pumping, enabling energy extraction in shallow water.

The assembly comprises a buoyant intake funnel 110 constructed to provide positive buoyancy. The funnel geometry provides a convergent nozzle effect, accelerating incoming flow and increasing dynamic pressure as fluid enters the narrower intake neck section 116.

The intake neck section 116 comprises an inner telescoping conduit member slidably received within an outer stationary conduit member 122. The inner telescoping member 116 is rigidly attached to the buoyant intake funnel 110, such that when the funnel 110 rises and falls with wave motion, the inner member 116 reciprocates vertically relative to the outer member 122.

A reciprocating seal assembly 125 is positioned at the sliding interface between the outer surface of the inner telescoping member 116 and the inner surface of the outer stationary member 122. The seal assembly 125 maintains hydraulic integrity across the telescoping interface while permitting reciprocating motion.

The outer stationary member 122 is rigidly connected to the primary conduit 130, which extends vertically downward through the water column. A check valve 320 is positioned at the junction between the outer stationary member 122 and the primary conduit 130.

During operation, the telescoping action creates a variable-volume pressure chamber within the volume defined by the telescoping members. As a wave crest lifts the buoyant funnel 110, the inner telescoping member 116 extends upward relative to outer member 122, creating volume expansion that draws water into the system through the debris screen 112. As the wave passes and the funnel 110 drops into the wave trough, the inner member 116 compresses downward relative to outer member 122, reducing chamber volume and forcibly ejecting water downward through check valve 320 into the primary conduit 130.

The check valve 320 enforces unidirectional flow, preventing backflow from the primary conduit 130 into the intake chamber. This rectifying action converts the oscillating wave motion into net downward hydraulic flow, effectively transforming the intake assembly into a wave-driven positive displacement pump.

Figure 3:
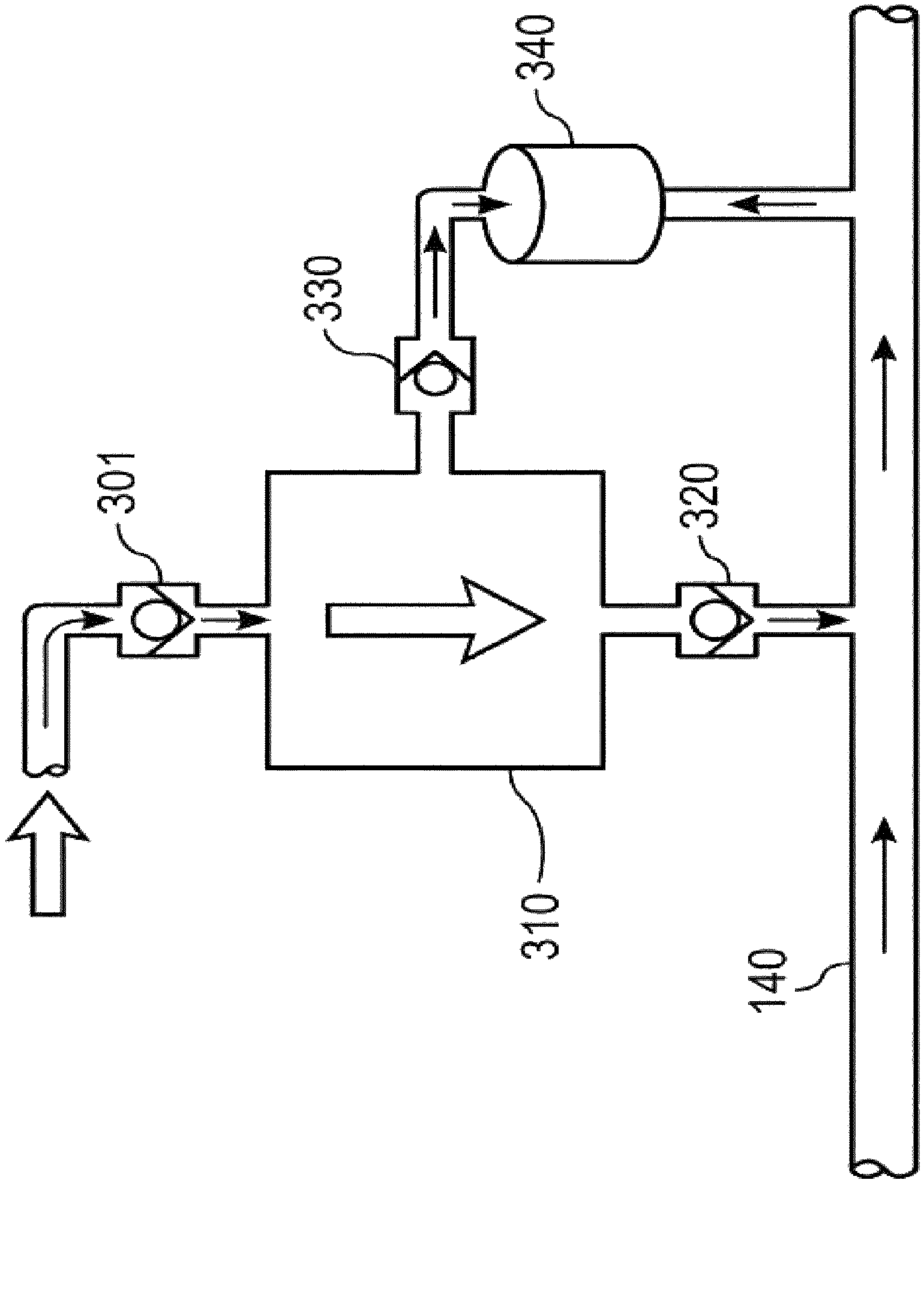
FIG. 3 is a schematic system architecture diagram illustrating control and power conditioning subsystems, including sensor inputs, signal processing, hydraulic control logic, accumulator management, and power conversion stages.
Figure 4:
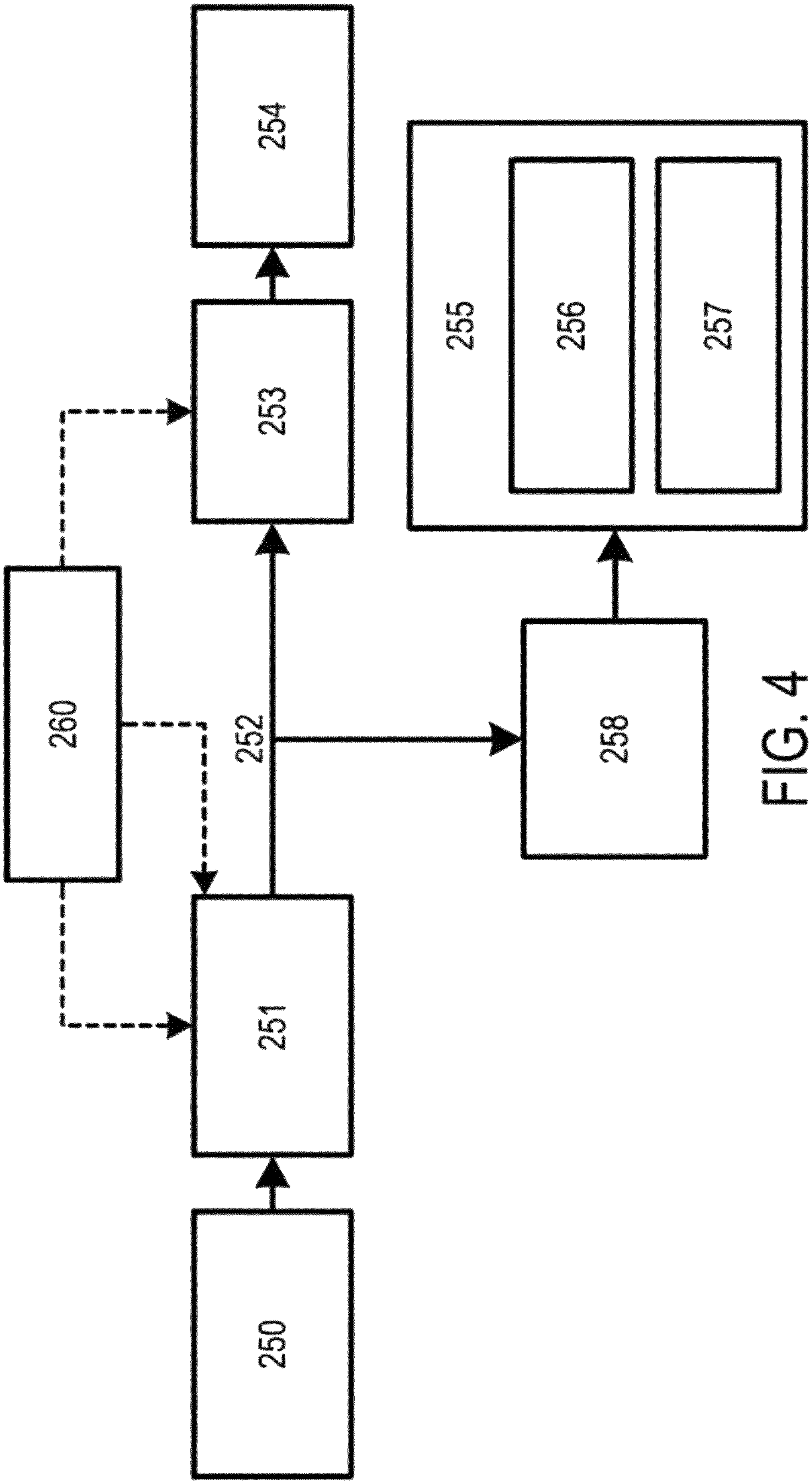
FIG. 4 is a hydraulic schematic diagram illustrating flow rectification logic, including inlet check valve, pressure chamber, outlet check valve, flow control valve, and hydraulic accumulator.

Hydraulic Rectification and Flow Smoothing System (FIGS. 3 & 4)

FIGS. 3 and 4 illustrate the hydraulic flow control and power conditioning architecture.

FIG. 43 presents the hydraulic schematic diagram. The primary flow path 140 carries fluid from the telescoping intake assembly through the inline turbine module. The flow rectification system comprises an inlet check valve 301, a pressure chamber 310 representing the variable-volume chamber created by telescoping action, an outlet check valve 320, a flow control valve 330, and a hydraulic accumulator 340.

The hydraulic accumulator 340 functions as an energy buffering component. The accumulator comprises a pressure vessel divided into gas and liquid chambers by a bladder, piston, or diaphragm. During wave crests when the telescoping pump generates peak pressure, hydraulic pressure compresses the gas chamber, storing energy. During wave troughs when pumping pressure drops, the compressed gas expands, forcing stored liquid back into the primary flow path 140, thereby maintaining flow velocity through the turbine.

This buffering effect smooths pressure pulses from wave pumping, maintains continuous turbine rotation between wave crests, reduces peak pressure spikes, and enables generator operation at rotational speed producing stable AC output.

The flow control valve 330 provides adjustment of turbine inlet velocity to match generator load and optimize efficiency across varying sea states.

FIG. 34 illustrates the complete system architecture including electronic control, monitoring, and power conditioning subsystems. The system includes a sensor suite 250 providing data on wave conditions, a signal processing module 251 that conditions sensor inputs, a central control computer 252 executing control algorithms, a hydraulic control interface 253 that actuates valves and ballast systems, and a power output stage 254 connecting to the electrical grid.

The hydraulic control interface 253 manages the flow control valve 330 and accumulator precharge pressure. A monitoring and diagnostics module 258 evaluates system health. Power conditioning electronics 255 comprise an AC-DC rectifier stage 256 converting generator output to DC, and a DC-AC inverter stage 257 producing grid-synchronized AC power. A remote monitoring system 260 provides telemetry.

Figure 5:
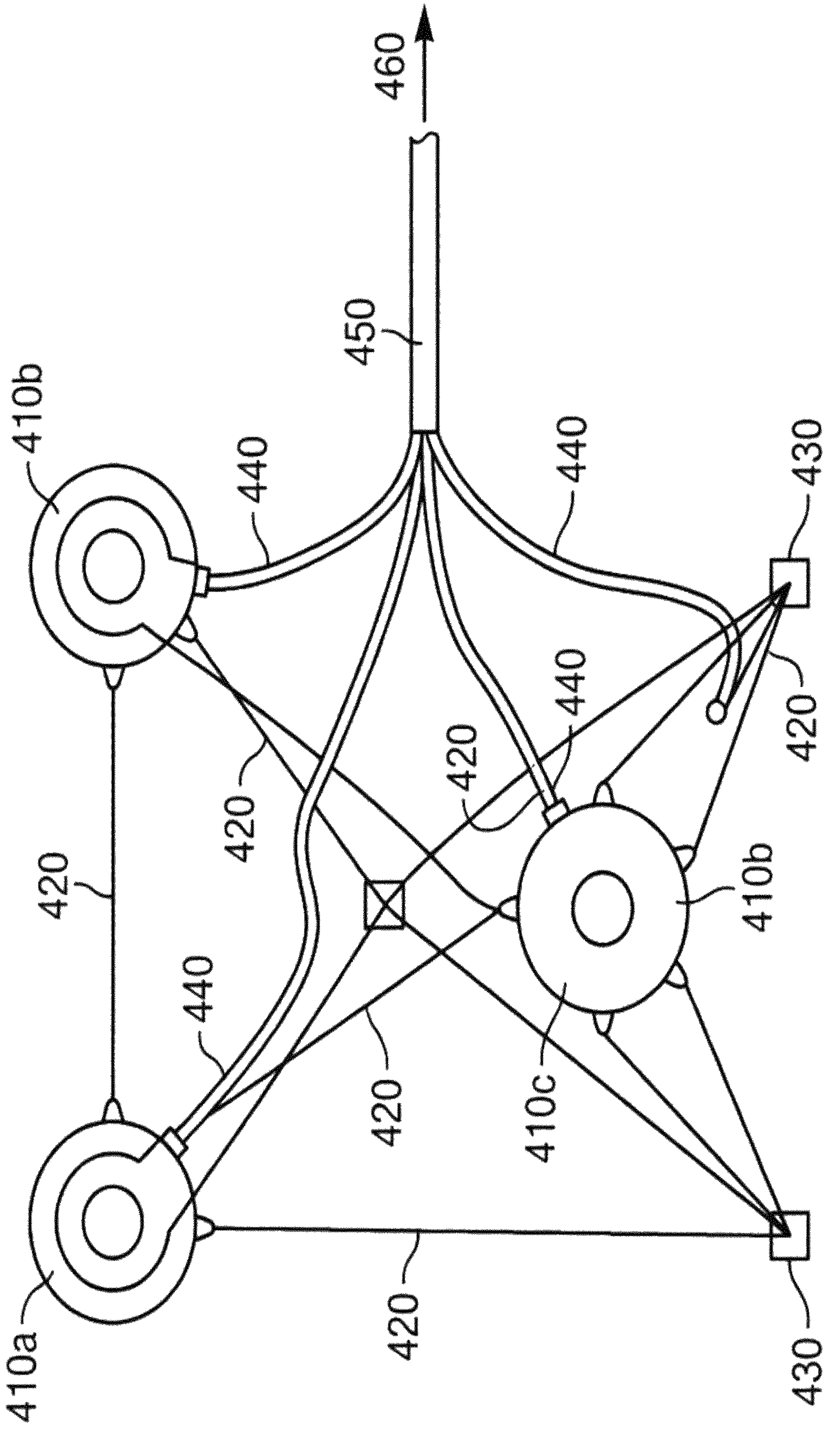
FIG. 5 is a plan view of a distributed array deployment, illustrating multiple hydrokinetic modules interconnected via a shared mooring network with common seabed anchors and power umbilicals converging to a central export cable.

Distributed Array Architecture and Scalable Deployment (FIG. 5)

FIG. 5 illustrates a distributed array deployment configuration. The invention implements a shared mooring network architecture.

A plurality of individual modular hydrokinetic systems 410*a*, 410*b*, 410*c* are mechanically interconnected via a shared mooring network 420. The mooring network 420 comprises a tether web connecting the buoyant modules to strategically positioned common seabed anchors 430.

Each module transmits generated electrical power via individual power umbilicals 440 that converge at a subsea junction. From the junction, a single central export cable 450 transports aggregated power to a grid connection point 460.

Each module is equipped with a dynamic ballast control module 250 capable of ingesting or purging seawater to adjust module buoyancy. Automated tensioner mechanisms 260 may be integrated into the mooring network. The system implements a control algorithm wherein the central control computer 252 communicates with modules to synchronize ballast adjustments and maintain array geometry.

This distributed architecture provides reduced per-unit installation cost through shared infrastructure, improved fault tolerance, phased deployment capability, simplified maintenance logistics, and reduced environmental footprint.

Figure 6:
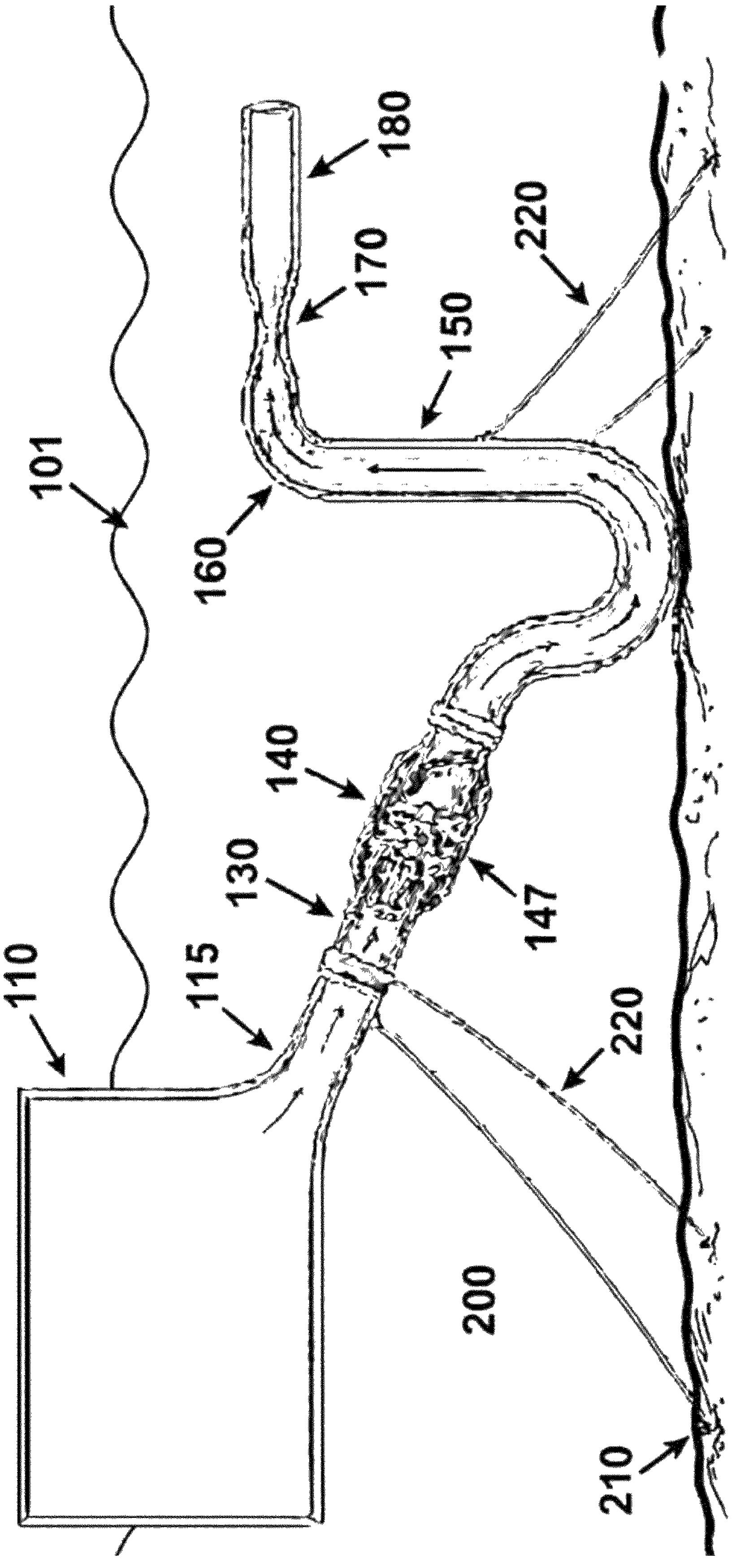
FIG. 6 is a perspective view of the system configured in surge mode operation with the primary conduit oriented substantially horizontal, illustrating the wide-aperture rectangular intake structure, convergent nozzle section, and inline turbine module.

Surge Mode Operation-Horizontal Configuration (FIG. 6)

FIG. 6 illustrates the surge mode embodiment, configured for environments where wave energy manifests as horizontal water particle velocity.

In this embodiment, the primary conduit 130 is oriented substantially horizontal or at an oblique inclination. The intake structure 110 is modified to a wide-aperture rectangular or elliptical geometry oriented perpendicular to prevailing wave propagation direction.

The wide aperture captures a cross-sectional area of moving water, while the convergent nozzle section 115 accelerates the flow into the narrower primary conduit 130, converting dynamic pressure into static pressure head.

The inline turbine module 140 remains positioned within the primary conduit 130, now oriented horizontally. The hydraulic rectification system (check valves 301, 320 and accumulator 340) remains essential because surge motion is bidirectional. The check valves ensure only forward flow drives the turbine, while the accumulator smooths oscillating flow into continuous rotation.

The return flow path 160 exits near the seabed 210, with the flow exit 150 positioned downstream of the intake. The flow direction indicator 180 illustrates unidirectional internal flow.

The mooring system comprises subsea tethers 220 connecting the conduit to seabed attachment points. The system may incorporate orientation control using the dynamic ballast control module 250 and automated tensioner 260.

Dynamic Mode Reconfiguration and Adaptive Operation

The invention provides ability to reconfigure between operational modes. The dynamic ballast control module 250 comprises a ballast tank, pump, and control valves capable of ingesting seawater to increase system weight or purging ballast to decrease weight. By adjusting buoyant forces versus gravitational forces, the system's center of buoyancy and center of gravity can be manipulated.

Working in coordination with the ballast system, the automated tensioner mechanism 260 adjusts the effective length and tension of the mooring tethers. To transition from vertical heave mode to horizontal surge mode: the ballast pump ingests seawater, shifting the center of gravity; the tensioner pays out tether length on the forward anchor while retracting tether on the aft anchor; the combined effect causes the conduit to tilt from vertical toward horizontal; the process reverses to return to vertical orientation.

This adaptive capability enables the system to optimize energy capture as wave climate varies. The control system can make these adjustments based on wave sensor inputs.

Thermodynamic Operation as an Open System

The invention operates as a mechanically driven hydrokinetic system powered by externally supplied wave energy, extracting usable energy from the surrounding ocean environment, which is driven by external solar radiation (differential heating creating wind, which creates waves) and lunar gravitational forces (tides and gravitational modulation of wave characteristics). The system does not violate conservation of energy principles because it does not operate in a closed equilibrium system.

The ocean surface represents an energy reservoir replenished at approximately 2-3 terawatts globally. The invention functions as a transducer converting a fraction of this wave energy into electrical form. The hydraulic flow within the closed conduit loop is maintained by external wave forcing.

Each wave cycle inputs energy through mechanical work performed by wave-induced pressure forces and buoyancy forces acting on the system components. The system would cease operation only if external wave forcing stopped, during which the accumulator 340 provides energy buffering.

What is claimed is:

1. A hydrokinetic energy harvesting system comprising:

a buoyant intake assembly positioned at a water surface, said intake assembly comprising an intake funnel and a debris screen;

a telescoping intake mechanism fluidly coupled to said intake assembly, said telescoping mechanism comprising an inner telescoping conduit member slidably received within an outer stationary conduit member, and a reciprocating seal assembly positioned at a sliding interface between said inner member and said outer member, wherein said inner member is configured to reciprocate vertically in response to surface wave motion;

a primary conduit extending from said outer stationary conduit member;

an inline turbine module positioned within said primary conduit, said turbine module comprising a turbine rotor mechanically coupled to an electrical generator;

a hydraulic rectification system comprising at least one check valve configured to enforce unidirectional flow through said turbine module; and a hydraulic accumulator fluidly coupled to said primary conduit, said accumulator configured to store hydraulic pressure during peak wave amplitude and release stored pressure during reduced wave amplitude, thereby maintaining continuous rotation of said turbine rotor;

wherein vertical oscillation of said buoyant intake assembly causes said inner telescoping member to reciprocate relative to said outer stationary member, creating a variable-volume pressure chamber that functions as a positive displacement pump to drive fluid through said turbine module.

2. The system of claim 1, wherein said primary conduit is configurable at an inclination angle between 0 degrees and 90 degrees relative to said water surface.

3. The system of claim 2, further comprising an inclination control subsystem comprising:

a ballast control module configured to adjust system buoyancy by ingesting or purging water; and a tensioning mechanism configured to adjust mooring tether length;

wherein operation of said ballast control module and said tensioning mechanism enables reconfiguration of said inclination angle.

4. The system of claim 1, wherein said intake funnel comprises a convergent nozzle geometry configured to accelerate incoming flow.

5. The system of claim 1, wherein said hydraulic rectification system comprises:

an inlet check valve positioned upstream of said variable-volume pressure chamber;

an outlet check valve positioned downstream of said variable-volume pressure chamber; and a flow control valve positioned upstream of said inline turbine module;

wherein said inlet check valve permits fluid ingress during an intake stroke and said outlet check valve enforces unidirectional discharge during a compression stroke.

6. The system of claim 1, wherein said hydraulic accumulator comprises a pressure vessel divided into a gas chamber and a liquid chamber by a movable separator element.

7. The system of claim 1, further comprising a mooring system comprising:

at least one seabed anchor;

pretensioned tethers connecting said system to a seabed; and a seabed mooring connection assembly configured to transfer tensile loads from said tethers to a seabed foundation.

8. A hydrokinetic energy system configurable for surge mode operation, comprising:

a primary conduit oriented at an inclination angle between 0 degrees and 45 degrees relative to horizontal;

an intake structure fluidly coupled to said primary conduit, said intake structure having a wide-aperture geometry;

a convergent nozzle section transitioning from said wide-aperture intake structure to said primary conduit;

an inline turbine module positioned within said primary conduit;

a hydraulic rectification system comprising check valves configured to convert bidirectional surge motion into unidirectional flow through said turbine module; and a hydraulic accumulator configured to maintain continuous turbine rotation.

9. The system of claim 8, wherein said wide-aperture geometry is selected from the group consisting of rectangular and elliptical shapes.

10. The system of claim 8, wherein said convergent nozzle section is configured to convert dynamic pressure into static pressure head.

11. A distributed array hydrokinetic power station comprising:

a plurality of modular hydrokinetic energy systems, each system comprising:

a buoyant intake assembly with telescoping mechanism;

a primary conduit housing an inline turbine module; and a hydraulic rectification and accumulator system;

a shared mooring network mechanically interconnecting said plurality of systems;

a plurality of common seabed anchors securing said mooring network to a seabed, wherein said number of common seabed anchors is less than the number of said modular systems;

individual power umbilicals transmitting electrical power from each of said modular systems; and a central export cable aggregating power from said individual umbilicals.

12. The power station of claim 11, wherein each of said modular systems is equipped with a ballast control module.

13. The power station of claim 11, further comprising a control system comprising:

a sensor suite providing data on wave conditions;

a central control computer executing algorithms; and a remote monitoring interface.

14. A method of harvesting hydrokinetic energy from wave motion, comprising:

deploying a hydrokinetic system comprising a telescoping intake assembly, a primary conduit containing an inline turbine, and a hydraulic rectification system;

positioning said telescoping intake assembly at a water surface such that vertical wave motion causes an inner telescoping member to reciprocate relative to an outer stationary member;

converting said reciprocating motion into pumping action that drives fluid through said primary conduit;

rectifying oscillating pressure using check valves to enforce unidirectional flow through said inline turbine;

buffering said oscillating pressure using a hydraulic accumulator to maintain continuous turbine rotation; and generating electrical power via an electrical generator mechanically coupled to said turbine.

15. The method of claim 14, further comprising adjusting an inclination angle of said primary conduit by adjusting ballast and coordinating mooring tether tension.

16. The method of claim 15, further comprising monitoring wave conditions using sensors and selecting an inclination angle based on wave characteristics.

17. The method of claim 14, wherein said hydrokinetic system is deployed as one of a plurality of systems in a distributed array, said method further comprising:

interconnecting said plurality of systems via a shared mooring network;

securing said mooring network to common seabed anchors; and aggregating electrical power from said plurality of systems via a central export cable.

18. The system of claim 1, wherein said debris screen comprises a mesh configured to prevent ingress of marine organisms and debris.

19. The system of claim 1, wherein said inline turbine module further comprises isolation valves positioned upstream and downstream of said turbine rotor.

20. The system of claim 1, further comprising a power conditioning subsystem comprising an AC-DC rectifier stage and a DC-AC inverter stage.

* * * * *